(12) United States Patent
Oh

(10) Patent No.: US 7,064,791 B2
(45) Date of Patent: Jun. 20, 2006

(54) DISPLAY APPARATUS HAVING FORMAT CONVERTER

(75) Inventor: Ji-byoung Oh, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 533 days.

(21) Appl. No.: 10/274,332

(22) Filed: Oct. 21, 2002

(65) Prior Publication Data

US 2003/0098927 A1    May 29, 2003

(30) Foreign Application Priority Data

Nov. 29, 2001  (KR)  .............................. 2001-74956

(51) Int. Cl.
*H04N 7/01* (2006.01)

(52) U.S. Cl. ...................... 348/441; 348/445; 348/555; 348/556

(58) Field of Classification Search ................ 348/441, 348/445, 446, 448, 447, 455, 555, 556, 554, 348/552, 553, 558; 345/603, 718, 204

See application file for complete search history.

(56) References Cited

U.S. PATENT DOCUMENTS

| | | | | |
|---|---|---|---|---|
| 4,872,054 | A | * | 10/1989 | Gray et al. ................. 348/441 |
| 5,218,436 | A | * | 6/1993 | Sugiyama et al. .......... 348/445 |
| 5,838,381 | A | | 11/1998 | Kasahara et al. |
| 5,978,656 | A | * | 11/1999 | Farine et al. .............. 455/41.1 |
| 6,078,702 | A | * | 6/2000 | Matono et al. ............. 382/298 |
| 6,097,437 | A | * | 8/2000 | Hwang ........................ 348/441 |
| 6,268,887 | B1 | * | 7/2001 | Watanabe et al. ........... 348/554 |
| 6,366,329 | B1 | * | 4/2002 | Oh .............................. 347/744 |

FOREIGN PATENT DOCUMENTS

| | | |
|---|---|---|
| DE | 40 15 020 A1 | 11/1991 |
| DE | 691 24 050 T2 | 5/1997 |
| DE | 695 03 220 T2 | 7/1998 |
| EP | 0 992 971 A2 | 4/2000 |

OTHER PUBLICATIONS

Sugiyama, M. et al. An advanced scan format converter with flexible and high quality processing. In: Proceedings of 1997 IEEE International Symposium on Consumer Electronics-ISCE'97, Dec. 1997, pp. 276-279.

(Continued)

*Primary Examiner*—Michael Lee
*Assistant Examiner*—Jean W. Désir
(74) *Attorney, Agent, or Firm*—Sughrue Mion, PLLC

(57) ABSTRACT

Provided is a display apparatus having an improved structure in which all of current and future personal computer (PC) signals and high definition TV (HDTV) signals as well as normal TV signals can be displayed with optimum picture quality. The display apparatus includes a format converter which inputs a video signal of various specifications, converts the video signal into a video signal having a similar horizontal frequency and outputs the video signal having the similar horizontal frequency, a driver which drives a display unit using the video signal converted through the format converter, and a deflection driver which generates a deflection signal appropriate for a video signal having converted formats based on horizontal and vertical frequencies of the video signal having the converted formats output from the format converter and supplies the deflection signal to the display unit. The display apparatus uses the format converter for converting an input video signal of various specifications into a video signal having a single format, thereby realizing optimum picture quality.

6 Claims, 3 Drawing Sheets

OTHER PUBLICATIONS

Van Lammeren, J.P.M. et al., Display processor for TV and SCGA signals. In: IEEE Transactions on Consumer Electronics, Aug. 1998,. vol. 44, Issue 3, pp. 718-728.

Sohne, T. et al., A video backend for multimedia TV-sets. In: IEEE Transactions on Consumer Electronics, Aug. 1998, vol. 44, issue 3, pp. 704-711.

* cited by examiner

DISPLAY APPARATUS HAVING FORMAT CONVERTER

BACKGROUND OF THE INVENTION

1. Field of the Invention

The present invention relates to a display apparatus for inputting video signals of various specifications, and more particularly, to a display apparatus having an improved structure in which all of current and future personal computer (PC) signals and high definition TV (HDTV) signals as well as normal TV signals can be displayed with optimum picture quality. The present application is based on Korean Patent Application No. 2001-74956, filed Nov. 29, 2001, which is incorporated herein by reference.

2. Description of the Related Art

Currently, the vertical frequency of a future HDTV mode is determined to be 50 Hz in China and Australia, and many problems are expected. That is, if video signals having a vertical frequency of 50 Hz are displayed on a display apparatus, flicker occurs. Also, if video signals having a vertical frequency of 50 Hz are converted into video signals having a vertical frequency of 100 Hz so as to reduce flicker, the horizontal frequency of the video signal is increased (around 55 Hz), and thus there is a problem in developing a deflection apparatus, a cathode ray tube, and a convergence controller, which correspond to the horizontal frequency of the video signal. As the horizontal frequency of the video signal is increased, the precision of control for deflection, the withstanding pressure of the cathode ray tube, and the precision of the convergence controller must all be increased.

The horizontal frequencies of a current cathode ray tube (CRT) are in the range of around 48 KHz, and the price of a CRT increases for CRTs beyond the range of 48 KHz, and thus profits for a display apparatus decrease.

In addition, in a multi-deflection mode, in which deflection parameters, which are appropriate for each of various frequencies are included and in which appropriate deflection parameters for an input video signal are selected and used, as the types (according to the input video signal specifications) of input video signals increase, it becomes increasingly difficult to maintain precise convergence, and thus the quality of the display apparatus is lowered.

FIG. 1 is a block diagram of the structure of a conventional display apparatus. The apparatus shown in FIG. 1 switches a normal PAL TV signal (625i/50 Hz) into PAL DTV signals in a R/G/B driver 108. Here, the vertical frequency of the input normal TV signal is 50 Hz but is converted into 100 Hz to reduce flicker. Here, i before "/" denotes interlaced scanning, and numerical values 50 and 100 after "/" denote vertical frequencies.

A problem common in display apparatuses is flicker. In particular, if normal TV signals of 50 Hz are displayed on a screen at a rate of 25 frames per second, frame flicker occurs.

The flicker detracts from viewing the screen and causes eye fatigue, and thus manufacturers of display apparatuses make an effort to remove or reduce flicker. The most general method for reducing flicker is to increase the vertical frequency of a video signal, that is, to increase the number of frames displayed per second.

Also, in the apparatus shown in FIG. 1, a normal TV signal having a vertical frequency of 50 Hz is converted into a signal having a vertical frequency of 100 Hz by a 100 Hz converter 106. In such a case, the horizontal frequency of the converted signal is around 31.5 KHz. Hereinafter, the phrase converted normal TV signal means a signal which has been obtained by converting a normal TV signal.

The input normal TV signal (RF or RGB) is input into a signal processor 102, and the signal processor 102 performs usual signal processing such as demodulation, elimination of noise, and compensation of picture quality. The normal TV signal output from the signal processor 102 is applied to the R/G/B driver 108 of the display apparatus so that a picture is reproduced.

The normal TV signal is converted into a signal having a vertical frequency of 100 Hz through an analog-to-digital converter (ADC) 104 and the 100 Hz converter 106 which is used to reduce flicker before being applied to the R/G/B driver 108.

The R/G/B driver 108 drives R/G/B electron guns (not shown) of a cathode ray tube (CRT) 110 by using a signal output from the 100 Hz converter 106.

The R/G/B driver 108 selects the converted normal TV signal or DTV signal, which is output from the 100 Hz converter 106, by switching.

The DTV signal may be formatted as 1080i/27 KHz, 576p/31.5 KHz, or 720p/38 KHz. Here, i and p before "/" denote interlaced scanning and progressive scanning, respectively, numerical values before "/" denote the number of effective vertical scanning lines (pixel numbers in the horizontal direction), and numerical values after "/" denote horizontal frequencies.

For example, 1080i/27 KHz means that the DTV signals have 1080 effective vertical scanning lines and are interlaced scanned, and have a horizontal frequency of 27 KHz.

The apparatus shown in FIG. 1 must deflect an input signal with different horizontal frequencies according to the type of input signal. That is, multi-deflection, which is equivalent to a horizontal frequency of 31.5 KHz for the converted normal TV signal and a horizontal frequency of 27 KHz, 31.5 KHz, or 38 KHz for DTV signal is required.

In the apparatus shown in FIG. 1, a mode discriminator 114 for recognizing the type of input signal, that is, whether the input signal is an analog signal or a digital signal, and the specifications of a digital signal, and a deflection driver 116 having a multi-deflection function for selectively providing a deflection operation that is appropriate for a signal displayed, with reference to the result of discrimination of the mode discriminator 114, are provided.

An operating voltage of a fly back transformer (FBT) used for deflection and a deflection yoke (DY) need to be changed into a desired voltage (e. g., 110 V~100 V) according to the signal being displayed, and for this purpose, a mode controller 118 and a power supply (B+) controller 120 are provided.

A deflection signal output from the deflection driver 116 and B+ power supply provided by the power supply (B+) controller 120 is provided to a deflector 122.

Meanwhile, a controller 112 controls the signal processor 102, the analog-to-digital converter (ADC) 104, the 100 Hz converter 106, the R/G/B driver 108, the deflection driver 116, and the mode controller 118 depending on the result of the discrimination by the mode discriminator 114. A control operation by the controller 112 is done by using an I²C bus.

The apparatus shown in FIG. 1 uses a so-called multi-deflection method having various deflection modes corresponding to the various characteristics of different types of video signals, and thus has the following problems.

First, multi-deflection having various deflection parameters equivalent to various horizontal frequencies is required. As a result, high precision deflection, a high withstanding pressure, a method for high precision focus, and a method for driving convergence corresponding to multi-deflection are required, thereby increasing cost and lowering quality.

Second, there is a limitation in the type of signals which may be input. That is, the type of input signal that can be handled is limited by the limitations of the deflection apparatus, the CRT, and the convergence apparatus.

Third, it is difficult to accommodate a PC signal. Since it is impossible to implement a display apparatus so that the vertical frequency and horizontal frequency of a PC signal are compatible with those of a normal TV signal or DTV signal, it is difficult to fashion a display apparatus that can additionally display PC signals.

SUMMARY OF THE INVENTION

To solve the above problems, it is an object of the present invention to provide a display apparatus having an improved structure in which video signals of various specifications can be displayed.

Accordingly, to achieve the above object, there is provided a display apparatus for displaying a video signal of various specifications, such as a normal TV signal, a DTV signal, and a PC signal. The apparatus includes a format converter which inputs a video signal of various specifications, converts the video signal into a video signal having a similar horizontal frequency and outputs the video signal having the similar horizontal frequency, a driver which drives a display unit using the video signal converted through the format converter, and a deflection driver which generates a deflection signal appropriate for a video signal having converted formats based on horizontal and vertical frequencies of the video signal having the converted formats output from the format converter and supplies the deflection signal to the display unit.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, the present invention will be described in detail by describing a preferred embodiment of the invention with reference to the accompanying drawings.

A display apparatus according to the present invention converts a video signal having one of various specifications into a video signal of an intermediate specification with compatibility, and thus can effectively respond to video signals of various specifications.

Figure 1:
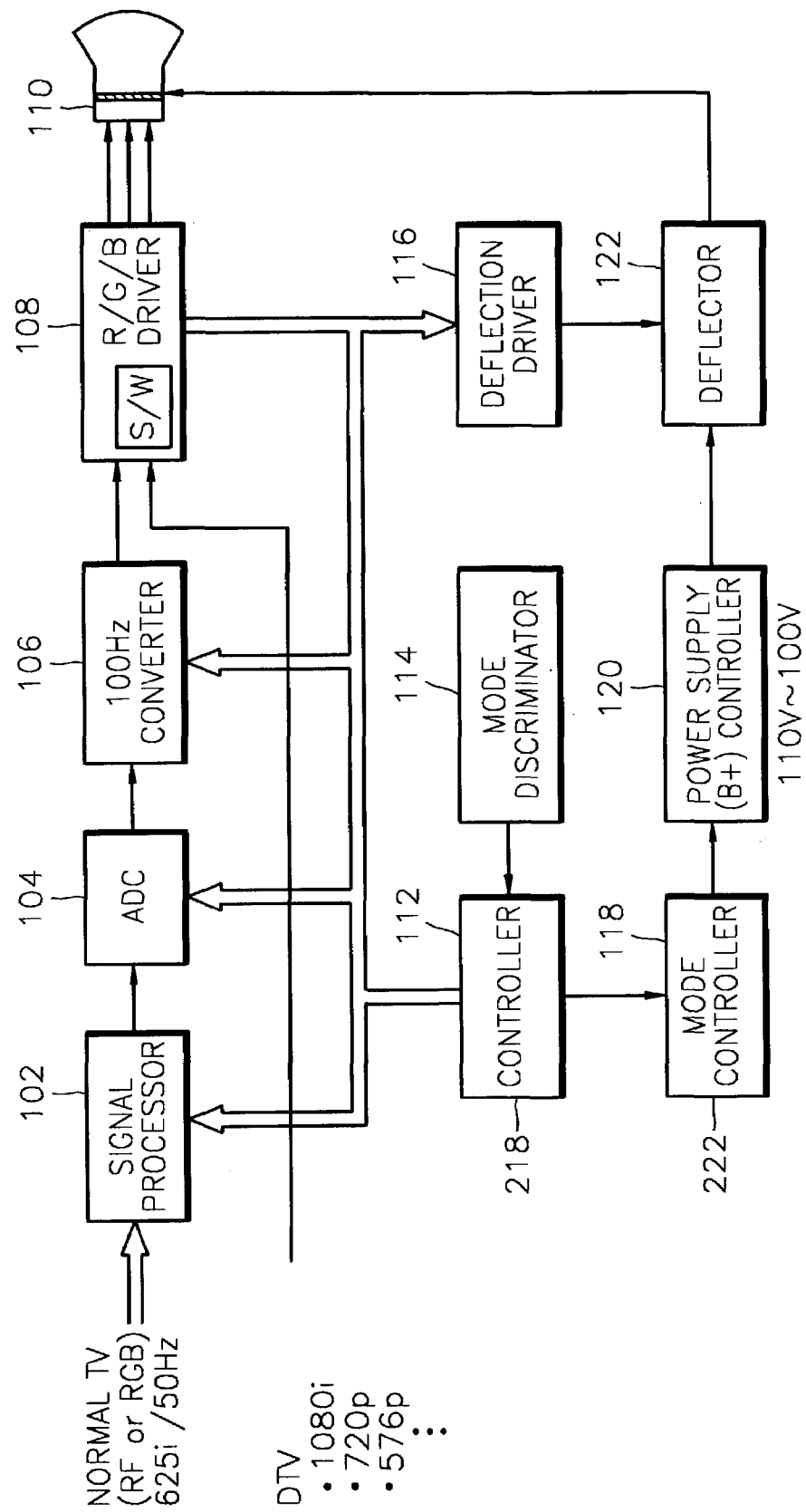
FIG. 1 is a block diagram of the structure of a conventional display apparatus.
Figure 2:
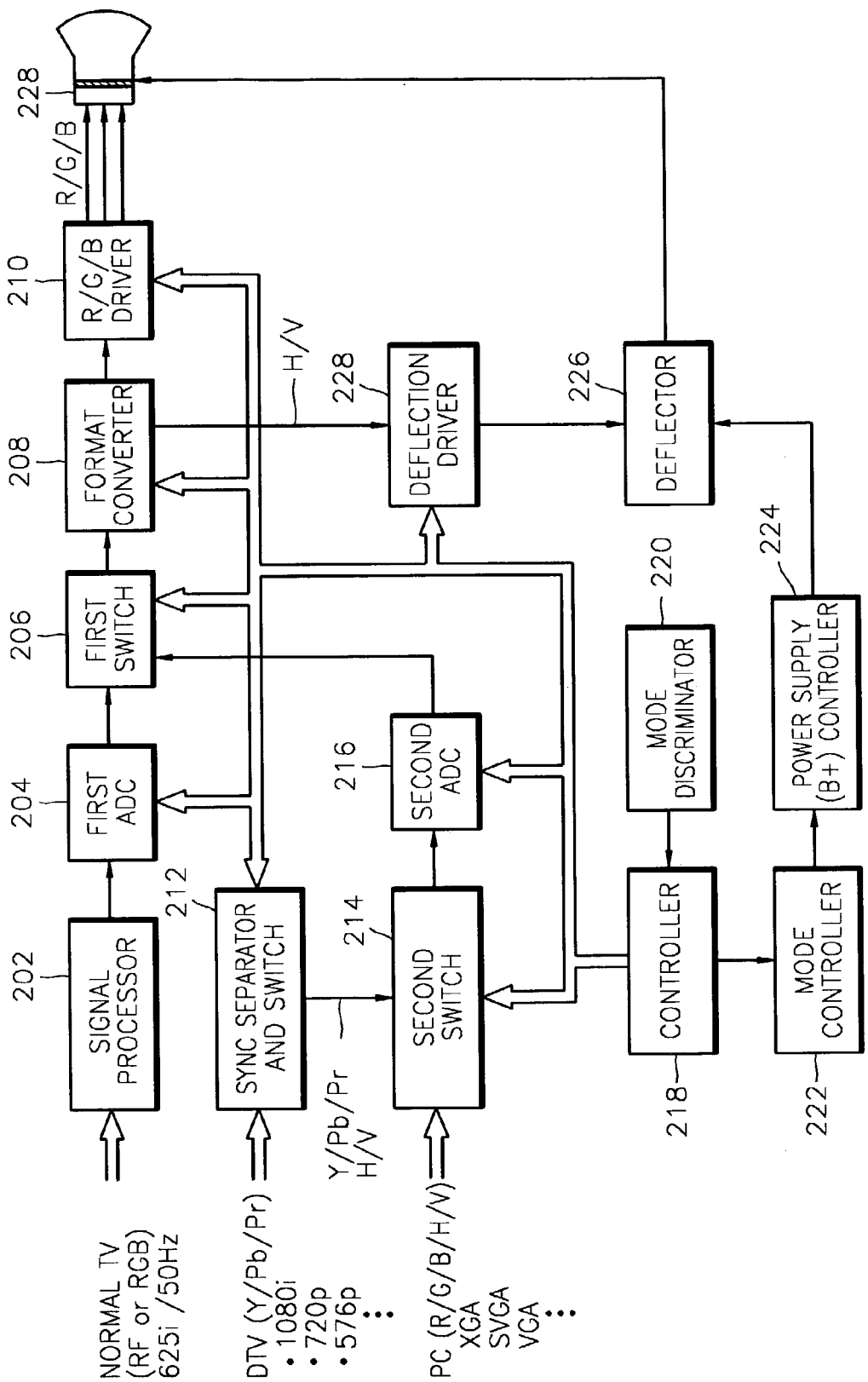
FIG. 2 is a block diagram of a display apparatus according to the present invention.

FIG. 2 is a block diagram of a display apparatus according to the present invention. Referring to FIG. 2, the display apparatus includes a signal processor 202, a first analog-to-digital converter (ADC) 204 for a video signal having a low horizontal frequency, a first switch 206, a format converter 208, a R/G/B driver 210, a cathode ray tube (CRT) 228, a sync separator and switch 212, a second switch 214, a second analog-to-digital converter (ADC) 216 for video signals having a high horizontal frequency, a deflection driver 228, a controller 218, a mode discriminator 220, a mode controller 222, a power supply (B+) controller 224, and a deflector 226.

The operation of the display apparatus shown in FIG. 2 will be described first by classifying into a system for processing normal TV signals, a system for processing a digital video signal and a PC signal, a system for performing format conversion, and a system for performing deflection and then by describing each system.

The system for processing a normal TV signal includes the signal processor 202 and the first ADC 204.

The signal processor 202 performs normal signal processing such as demodulation, elimination of noises, and compensation of picture quality, with respect to input analog video signals.

The first ADC 204 performs analog-to-digital conversion with respect to R/G/B signals provided by the signal processor 202. Output of the first ADC 204 is provided to the first switch 206.

The system for processing a digital video signal and a PC signal includes the sync separator and switch 212, the second switch 214, and the second ADC 216.

The sync separator and switch 212 input digital video signals of various specifications, selects one among them, and separates horizontal and vertical synchronizing signals from the selected digital video signal. Signals Y/Pb/Pr/Hsync/Vsync, which are output from the sync separator and switch 212 are provided to the second switch 214. Here, Y, Pb/Pr, Hsync, and Vsync denote a luminance signal, a color-difference signal, a horizontal synchronizing signal, and a vertical synchronizing signal, respectively.

The second switch 214 selects one of the digital video signals or PC signals provided by the sync separator and switch 212 and outputs the selected digital video signal or PC signal.

The second ADC 216 performs analog-to-digital conversion with respect to the digital video signal or PC signal provided by the second switch 214.

The output of the second ADC 216 is provided to the first switch 206.

The first switch 206 selectively outputs the output of the first ADC 202 or the output of the second ADC 216.

The system for performing format conversion includes the format converter 208. The format converter 208 performs an operation of converting video signals of various specifications into video signals of an intermediate specification having a similar horizontal frequency. Details of the conversion operation of the format converter 208 will be described later.

The R/G/B driver 210 drives R/G/B electron guns (not shown) in the CRT 228 using a video signal output from the format converter 208.

The system for performing deflection includes the deflection driver 228, the mode discriminator 220, the mode controller 222, the power supply (B+) controller 224, and the deflector 226.

The mode discriminator 220 recognizes the type of signal to be displayed by the display apparatus shown in FIG. 2.

The deflection driver 228 provides a deflection signal, which is appropriate for the signal to be displayed, with reference to the result of the discrimination performed by the mode discriminator 220 and the Hsync and Vsync signals provided by the format converter 208.

For the convenience of deflection operation, the mode controller 222 and the power supply (B+) controller 224 are provided so that the operating voltage of a fly back transformer (FBT) can be changed in accordance with a designer's desired voltage (e. g., 110 V~100 V) to correspond to the displayed signals.

The deflector 226 generates deflection current, which is provided to deflection coils attached to the CRT 210. The deflection coils have large inductance. Thus, in order to control the deflection force, the inductance of the deflection coils must be adjusted. However, a voltage B+ applied to the deflector 226 may be simply adjusted. That is, the deflection force may be slightly adjusted by adjusting the current applied to the deflection coils.

The deflection signals output from the deflection driver 228 and the B+ power supply provided by the power supply (B+) controller 224 are provided to the deflector 226.

Meanwhile, the controller 218 controls the signal processor 202, the first ADC 204, the first switch 206, the format converter 208, the R/G/B driver 210, the sync separator and switch 212, the second switch 214, the second ADC 216, the deflection driver 228, and the mode controller 222, with reference to the result of discrimination of the mode discriminator 220.

The control operation of the controller 220 is performed through an I²C bus.

The CRT 228 constitutes a display unit in the abstract of the disclosure of the present invention.

The operation of the format converter 208 shown in FIG. 2 will be described in detail.

Figure 3:
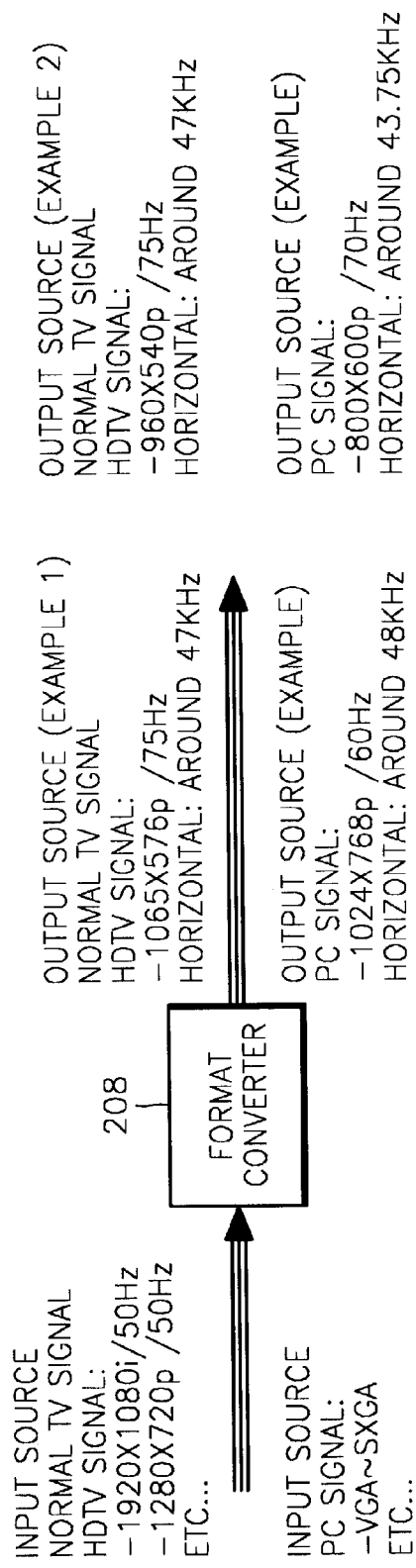
FIG. 3 illustrates the operation of a format converter shown in FIG. 2.

FIG. 3 illustrates the operation of the format converter 208 shown in FIG. 2.

The format converter 208 converts normal TV, DTV, and PC signals into compatible formats to realize optimum picture quality regardless of the type of applied signals. These formats are adjusted to a horizontal frequency of around 48 KHz or 43 KHz.

In the case of a horizontal frequency of 48 KHz, the normal TV signal and a HDTV signal are changed to have a vertical frequency of 75 Hz and 576 effective scanning lines, while the PC signal is changed to the format of the extended graphic array (XGA, 1024×768/60 Hz) mode. Thus, the horizontal frequency of the normal TV signal, the HDTV signal, which is expected to be a basic format, and the PC signal is converted into a horizontal frequency of 47 KHz to 48 KHz.

In the case of a horizontal frequency of 43 KHz, the normal TV signal or the HDTV signal is changed to have a vertical frequency of 75 Hz, 540 effective scanning lines, while the PC signal is changed to the format of the super video graphic array (SVGA, 800×600/70 Hz) mode. Thus, the horizontal frequency of the normal TV signal, the HDTV signal, and the PC signal is converted into a horizontal frequency of around 43 KHz.

For your reference, the horizontal frequency may be schematically expressed as the total number of horizontal scanning lines×the vertical frequency.

Likewise, the horizontal frequency of the normal TV, HDTV, and PC signal is converted into 43 KHz or around 48 KHz through the format converter 208, and thus problems with deflection and convergence in the display apparatus for receiving various signals can be solved.

Here, the mode controller 222 and the power supply (B+) controller 224 control the operating voltage of the FBT and a deflection yoke (DY) (not shown), corresponding to a horizontal frequency of 48 KHz or 43 KHz.

In addition, optimum picture quality may be realized when the format of the DTV signal is converted into the format of 43 KHz, and the format of the PC signal is converted into the format of 48 KHz.

The display apparatus according to the present invention is useful for performing processing of a normal TV signal, a DTV signal, and a PC signal and especially useful for eliminating flicker. In particular, the display apparatus is more useful in a case where the vertical frequencies of the NTSC signal and the PAL video signal are not consistent.

Meanwhile, the format converter and the first and second ADC are separately constituted in FIG. 2 but they may be included in a single integrated circuit.

As described above, the display apparatus according to the present invention has a format converter for converting an input video signal having one of various specifications into a video signal of a single format, thereby realizing optimum picture quality.

In addition, the display apparatus according to the present invention can be compatible with the specifications of future new video signals.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A display apparatus for displaying an input video signal having one of a plurality of specifications, the apparatus comprising:
   a format converter which inputs the video signal having one of various specifications, converts the video signal into a converted video signal having a converted horizontal frequency and outputs the video signal having the converted horizontal frequency;
   a driver which drives a display unit using the converted video signal; and
   a deflection driver which generates a deflection signal appropriate for a video signal having converted formats based on the converted horizontal frequency and the vertical frequency of the converted video signal and supplies the deflection signal to the display unit;
   wherein the format converter is adapted to convert as the input video signal, a normal TV signal, a DTV signal, or a PC signal into the converted video signal having a converted horizontal frequency of approximately 48 KHz; and
   wherein in the format converter, the normal TV signal and the HDTV signal are changed to have a vertical frequency of 75 Hz and 576 effective scanning lines, while the PC signal is changed to a format of an extended graphic array (XGA, 1024×768/60 Hz) mode.

2. A display apparatus for displaying an input video signal having one of a plurality of specifications, the apparatus comprising:
   a format converter which inputs the video signal having one of various specifications, converts the video signal into a converted video signal having a converted horizontal frequency and outputs the video signal having the converted horizontal frequency;
   a driver which drives a display unit using the converted video signal; and
   a deflection driver which generates a deflection signal appropriate for a video signal having converted formats based on the converted horizontal frequency and the vertical frequency of the converted video signal and supplies the deflection signal to the display unit;

wherein in the format converter, if the input video signal is a normal TV signal, a DTV signal, or a PC signal, the input video signal is converted into the converted video signal having a converted horizontal frequency of around 43 KHz; and wherein in the format converter, the normal TV signal and HDTV signal are changed to have a vertical frequency of 75 Hz, a converted horizontal frequency of 43 KHz, and 540 effective scanning lines, while the PC signal is changed to the format of the super video graphic array (SVGA, 800×600/70 Hz) mode.

3. A display apparatus for displaying an input video signal having one of a plurality of specifications, the apparatus comprising:

a format converter which inputs the video signal having one of various specifications, converts the video signal into a converted video signal having a converted horizontal frequency and outputs the video signal having the converted horizontal frequency;

a driver which drives a display unit using the converted video signal; and a deflection driver which generates a deflection signal appropriate for a video signal having converted formats based on the converted horizontal frequency and the vertical frequency of the converted video signal and supplies the deflection signal to the display unit;

wherein, if the input video signal is a normal TV signal or a DTV signal, the format converter converts the input video signal into the converted video signal having a converted horizontal frequency of around 43 KHz, and if the input video signal is a PC signal the format converter converts the horizontal frequency of the PC signal into a converted horizontal frequency of around 48 KHz.

4. The apparatus of claim 3, wherein the display unit is a cathode ray tube (CRT) including a fly back transformer (FBT) and a deflection yoke (DY) and further includes a power supply controller for adjusting the operating voltages of the FBT and the DY so as to be appropriate for a video signal having a horizontal frequency of around 43 KHz or 48 KHz.

5. A display apparatus for displaying an input video signal having one of a plurality of specifications, the apparatus comprising:

a format converter which inputs the video signal having one of various specifications, converts the video signal into a converted video signal having a converted horizontal frequency and outputs the video signal having the converted horizontal frequency;

a driver which drives a display unit using the converted video signal;

a deflection driver which generates a deflection signal appropriate for a video signal having converted formats based on the converted horizontal frequency and the vertical frequency of the converted video signal and supplies the deflection signal to the display unit;

a first analog-to-digital converter (ADC) for a video signal having a low frequency, which, if the input video signal is a normal TV signal, converts the normal TV signal into an analog/digital signal and provides the analog/digital signal to the format converter; and a second analog-to-digital converter (ADC) for a video signal having a high frequency, which, if the input video signal is a DTV signal or a PC signal, converts the DTV signal or the PC signal into an analog/digital signal and provides the analog/digital signal to the format converter.

6. The apparatus of claim 5, further comprising:

a second switch for selectively providing the DTV signal or the PC signal to the second ADC; and a first switch for selectively providing the normal TV signal and the output of the second switch to the format converter.

* * * * *